United States Patent [19]
Mott

[11] Patent Number: 6,003,657
[45] Date of Patent: Dec. 21, 1999

[54] SELF-INDICATING TENSIONER FOR A BELT SCRAPER

[75] Inventor: George T. Mott, Alburtis, Pa.

[73] Assignee: ASGCO Manufacturing, Inc., Allentown, Pa.

[21] Appl. No.: 09/117,088

[22] PCT Filed: Dec. 2, 1997

[86] PCT No.: PCT/US97/22240

§ 371 Date: Jul. 23, 1998

§ 102(e) Date: Jul. 23, 1998

[87] PCT Pub. No.: WO98/24715

PCT Pub. Date: Jun. 11, 1998

Related U.S. Application Data

[60] Provisional application No. 60/032,272, Dec. 2, 1996.

[51] Int. Cl.[6] .................................................. B65G 45/16
[52] U.S. Cl. ............................................................ 198/499
[58] Field of Search ...................................... 198/497, 499

[56] References Cited

U.S. PATENT DOCUMENTS

| | | |
|---|---|---|
| 2,685,808 | 8/1954 | Garvin . |
| 3,631,968 | 1/1972 | Ward . |
| 4,233,837 | 11/1980 | Canfield . |
| 4,664,250 | 5/1987 | Jakobs ..................................... 198/499 |
| 4,936,439 | 6/1990 | Alexander, Jr. et al. . |
| 5,007,523 | 4/1991 | Morefield . |
| 5,016,746 | 5/1991 | Gibbs ..................................... 198/499 |

*Primary Examiner*—James R. Bidwell
*Attorney, Agent, or Firm*—Dann, Dorfman, Herrell and Skillman, P.C.

[57] ABSTRACT

A self-indicating tensioning device for a scraper blade includes a flat spring coupled at one end to a rotatable shaft which supports the blade and coupled at it's other end to an adjusting mechanism. The adjusting mechanism is operable to exert a force on the flat spring which in turn applies a torque to the rotatable shaft for displacing the scraper blade. An indicator rod has one end fixed to the rotatable shaft and the other end is free and located adjacent to a graduated indicator plate.

5 Claims, 3 Drawing Sheets

SELF-INDICATING TENSIONER FOR A BELT SCRAPER

This application claims the benefit of U.S. Provisional Application No. 60/032,272, filed Dec. 2, 1996.

FIELD OF THE INVENTION

The present invention relates to a tensioning device for adjusting the force with which the blade of a conveyor belt scraper contacts the conveyor belt surface, and in particular, to such a device which provides an indication of the amount of force being applied by the tensioning device.

BACKGROUND OF THE INVENTION

A conveyor belt typically includes one or more scraper assemblies that are constructed and disposed along the belt for removing remnants of materials carried by the conveyor belt that adhere to the belt surface. A scraper assembly often includes one or more scraper blades arranged across the width of the conveyor belt. The blades are mounted on a support arm or arms that are affixed to and extend from a transversely mounted, rotatable support shaft. Rotation of the transverse support shaft moves the scraper blade or blades into and out of contact with the belt surface.

The cleaning efficiency of the scraper assembly depends on the magnitude of the force exerted by the scraper blade against the belt surface. If the contacting force is too great, the scraper blade will wear prematurely. On the other hand, if the contacting force is too low, the blade will not clean the belt efficiently. Torsional coil springs, torsion rod springs, air cylinders, hydraulic cylinders, and similar devices are used to adjust the force with which a scraper blade contacts a conveyor belt surface. In pneumatic and hydraulic systems a pressure gage provides an indication that can be correlated with the amount of force being applied. It would be highly desirable to have a tensioning device for a belt scraper assembly that provides an instantaneous indication that can be easily used to reproducibly set the amount of force with which the scraper blade contacts the belt surface.

SUMMARY OF THE INVENTION

In accordance with the present invention, there is provided a self-indicating tensioning device for adjusting the contacting force of a scraper blade against the surface of an endless conveyor belt. The self-indicating tensioning device according to this invention has a rotatable shaft which supports the scraper blade such that rotation of the rotatable shaft displaces the scraper blade vertically. A flat spring is coupled at one end to the rotatable shaft and at the other end to an adjusting mechanism. The adjusting mechanism exerts a force on the flat spring which thereby applies a torque to the rotatable shaft. The end coupled to the adjusting device is movable relative to the end affixed to the rotatable shaft. An indicator rod extends radially from the rotatable shaft with one end fixed to the rotatable shaft and the other end is free such that the force exerted on the flat spring does not cause deflection of the indicator rod. A graduated indicator plate is attached to the movable end of the flat spring and is movable relative to the indicator rod. As the flat spring deflects in response to the application of force thereto, the displacement of the graduated indicator plate relative to the free end of the indicator rod provides an indication of the amount of force exerted on the flat spring, the amount of torque applied to the rotatable shaft, or the amount of force with which the scraper blade contacts the conveyor belt.

BRIEF DESCRIPTION OF THE DRAWINGS

The foregoing summary of the present invention, as well as the following description of a preferred embodiment thereof, will be better understood by referring to the drawings, wherein.

DESCRIPTION OF A PREFERRED EMBODIMENT

Figure 1:
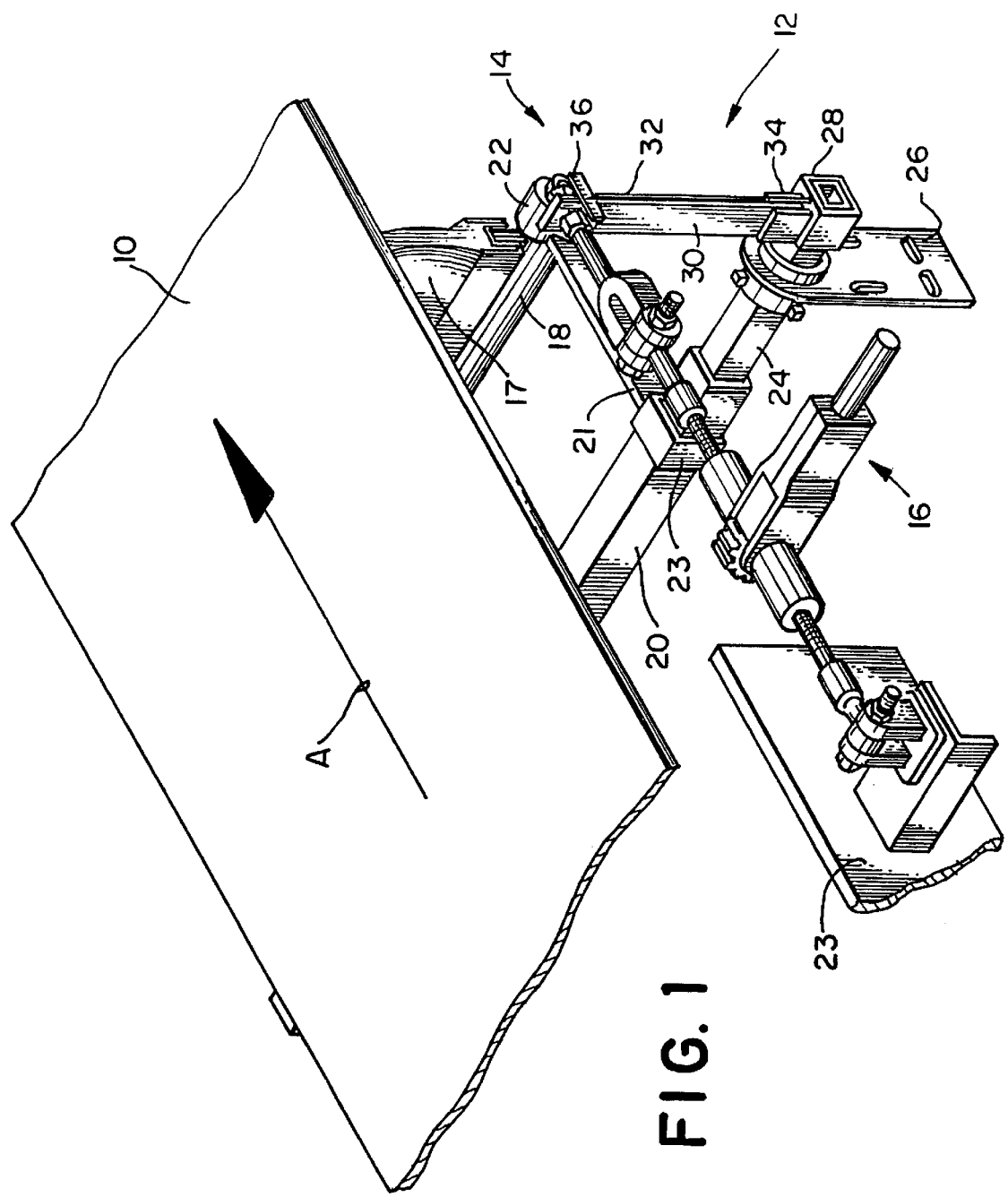
FIG. 1 is a perspective view showing a portion of a conveyor belt and a scraper assembly used in connection therewith in accordance with the present invention.

Referring now to FIG. 1, there is shown a portion of a conveyor belt 10 which travels in a direction indicated by the arrow A. A belt cleaning assembly 12 is disposed adjacent to the belt 10. The belt cleaning assembly 12 includes a scraper assembly 14 and a tensioning assembly 16 mechanically linked to the scraper assembly 14. The scraper assembly 14 includes a scraper blade 17 that is positioned under and maintained in contact with the conveyor belt 10 for cleaning off remnants of the material being carried by the conveyor belt 10. The scraper blade 17 is mounted on a blade support bar 18 which spans the width of the conveyor belt 10. The ends of blade support bar 18 engage with receptacles or openings in the blade ends of a pair of pivot arms which link the blade support bar to a rotatable cross shaft 20 that also spans the width of the conveyor belt 10 in parallel relation to the blade support bar 18. The rotatable cross shaft 20 has a generally polygonal, preferably square, cross section. For clarity, only the near side pivot arm 21, its blade end 22, and its cross-shaft end 23 are shown in FIG. 1. The cross-shaft end 23 of pivot arm 21 is formed to engage with cross shaft 20 such that it can rotate therewith. To that end the cross-shaft ends of the pivot arms include polygonal shaped openings therethrough. In the embodiment shown in FIG. 1, cross-shaft end 23 has a square opening therein for receiving the square cross shaft 20.

Figure 3:
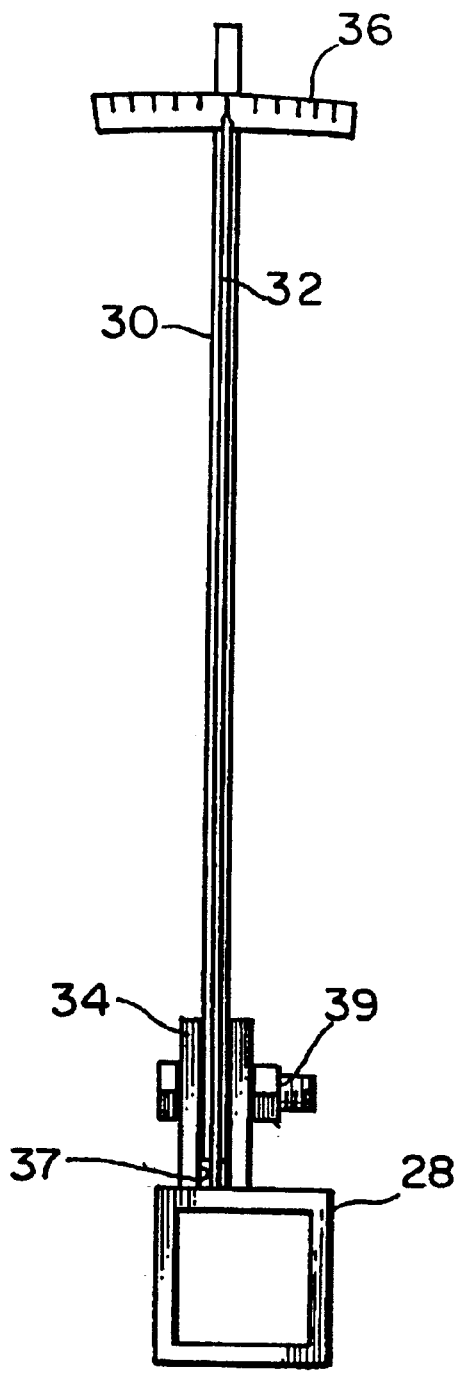
FIG. 3 is an elevational view of a spring and indicator subassembly of the tensioning device shown in FIG. 2 when the torque applying mechanism is in the neutral position.

An extension 24 extends from the near end of cross shaft 20 and through a support bracket 26 that is mounted to the support frame of the conveyor belt 10. A similar arrangement (not shown) is provided on the far end of cross shaft 20. The extensions have polygonal cross sections that match that of cross shaft 20 although smaller in dimension. A connector block 28 is mounted on the outboard end of extension 24 so that it can be rotated therewith. In the embodiment shown in FIG. 3, connector block 28 has a square opening therein for receiving the square extension shaft 24. Extending from one side of connector block 28 is a flat or leaf spring 30 and an indicator rod 32 which are fastened to a bracket 34 on connector block 28. An indicator plate 36 is affixed to the end of the flat spring 30 that is distal from the connector block 28. Indicator plate 36 has a plurality of graduations formed thereon. The free end of indicator rod 32 is positioned adjacent to the indicator plate 36.

The flat spring 30 is preferably machined from flat stock of a spring steel. Because conveyor belts of different widths require different amounts of scraper blade force for effective cleaning, the force applied to the flat spring 30 will depend on the width of the belt with which it is used. The thickness of the spring steel flat stock is selected based on the amount of force that will be exerted on the spring 30 and the maximum amount of deflection that can be tolerated for the spring 30 when stressed. To accommodate the use of various thicknesses of springs, the bracket 34 has a fixed space 37 which is dimensioned to receive a spring having the maximum desired thickness. When springs of smaller thickness are used, one or more shims are employed to fill out the bracket space and ensure a tight fit. The flat spring 30 and any necessary shim(s) are secured to the bracket 34 with a suitable fastener, preferably a bolt and nut assembly 39.

The tensioning assembly 16 is connected between a fixed structure 23, such as the conveyor support frame, and the movable end of spring 30. The tensioning assembly 16 operates to displace the movable end of spring 30, thereby imparting torque to pivot the cross shaft 20 to raise scraper blade 17 into engagement with the conveyor belt 10 or to lower it into disengagement therefrom.

Figure 2:
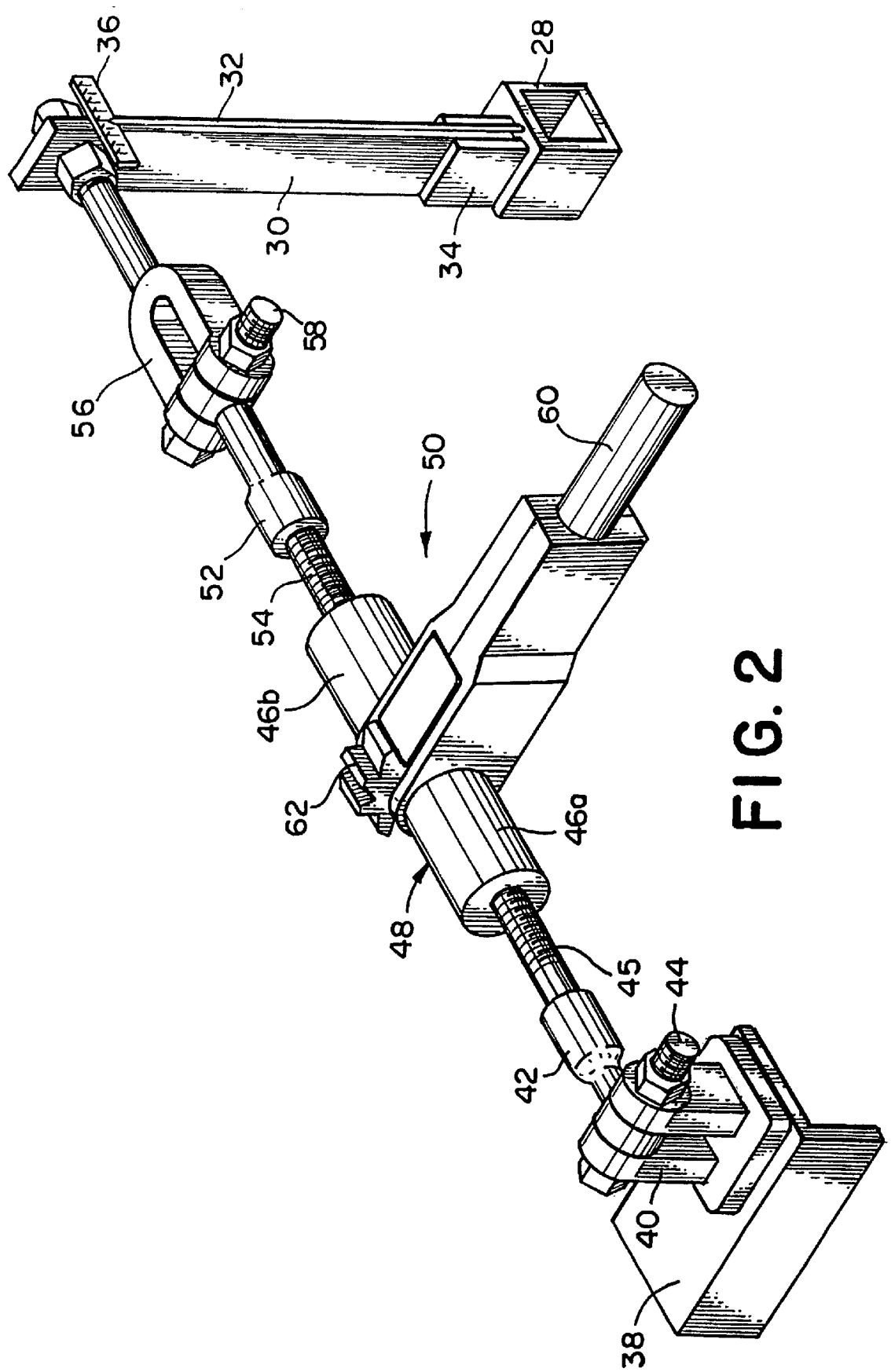
FIG. 2 is a perspective view showing a tensioning device in accordance with the present invention for use with the scraper assembly shown in FIG. 1.

Referring now to FIG. 2, a mounting bracket 38 is attached to a convenient fixed structure such as the conveyor support frame. An anchor clevis 40 is attached to the mounting bracket 38. An anchor rod 42 is coupled to the anchor clevis 40 with a bolt and nut assembly 44. The anchor rod 42 has a threaded end 45 that is threaded into one end 46a of a barrel 48 that is part of a force actuator 50. A drive rod 52 has a threaded end 54 that is threaded into the opposite end 46b of barrel 48. The non-threaded end of drive rod 52 is coupled to a drive clevis 56 with a bolt and nut assembly 58. The drive clevis 56 is fastened to the end of the flat spring 30 by any suitable means.

The force actuator 50 includes a handle 60 and ratchet mechanism 62 for rotating the barrel 48. The thread on threaded end 45 of anchor rod 42 is counter to that on threaded end 54 of drive rod 52. Therefore, when the force actuator barrel 48 is rotated, the drive rod 52 moves toward or away from anchor rod 42 depending on the direction of rotation of the force actuator barrel 48. As the force actuator barrel 48 is rotated, either a pulling or a pushing force is applied to the end of spring 30 through drive clevis 56. The force thus applied to the end of spring 30 causes a torque to be applied to connector block 28, and in turn to cross shaft 20. That torque causes cross shaft 20 to rotate thereby bringing scraper blade into engagement with or disengagement from conveyor belt 10. As greater force is applied to spring 30, more torque will be applied to cross shaft 20, thereby causing scraper blade 17 to contact the conveyor belt 10 with proportionally greater force.

Figure 4:
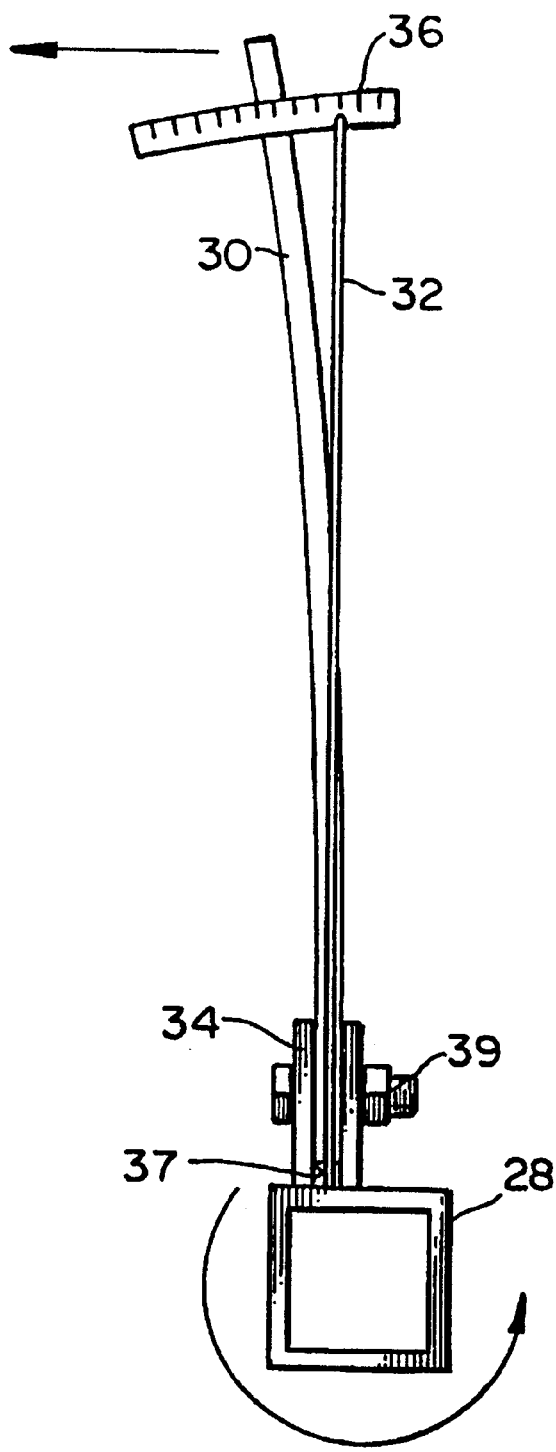
FIG. 4 is an elevational view of the spring and indicator subassembly of the tensioning device shown in FIG. 3, showing how the leaf spring is displaced when force is applied thereto.

However, when scraper blade 17 is in contact with belt 10, cross shaft 20, which is formed of a rigid material such as steel, will resist the torque applied to it through connector block 28. Consequently, the movable end of spring 30 will deflect in the direction of the force applied to it as shown in FIG. 4. The indicator rod 32 attached to connector block 28 will not deflect as force is applied to the spring 30. The indicator plate 36 affixed to spring 30 will move relative to the free end of indicator rod 32 as the end of spring 30 deflects. The graduation that is then adjacent to the free end of indicator rod 32 provides an indication of the amount of torque that is being applied to connector block 28 and cross shaft 20. The graduations on indicator plate 36 can be calibrated to provide an indication of the amount of force with which the scraper blade 17 contacts the belt surface. Alternatively, the graduations on indicator plate can be calibrated to indicate the amount of torque applied to the rotatable shaft or the amount of force with which the scraper blade contacts the conveyor belt. It will be appreciated that the arrangement described provides a significant advantage in providing the ability to set and reproducibly reset the scraper blade force by simply operating the force actuator 30 until the desired graduation on indicator plate 36 is adjacent the end of indicator rod 32.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

What is claimed is:

1. A self-indicating tensioning device for adjusting the contacting force of a scraper blade against the surface of an endless conveyor belt, the tensioning device comprising:

a rotatable shaft which supports the scraper blade such that rotation of said rotatable shaft results in displacement of the scraper blade toward or away from the belt;

an elongated flat spring coupled at one end to said rotatable shaft;

an adjusting mechanism coupled to a second end of said flat spring distal from said rotatable shaft for displacing the second end of said flat spring;

an indicator rod extending radially from said rotatable shaft and having one end fixed to said rotatable shaft and the other end free;

an indicator plate affixed to the second end of said flat spring;

said flat spring being adapted to deflect in response to the application of force by said adjusting device and cause displacement of said graduated indicator plate relative to the free end of said indicator rod.

2. The tensioning device as recited in claim 1, wherein said indicator device comprises a pointer.

3. The tensioning device as recited in claim 1, wherein said adjusting device comprises a turnbuckle with two counter-threaded links, one of said links being coupled to a conveyor support structure and the other end being connected to said flat spring.

4. The tensioning device as recited in claim 3, wherein said turnbuckle comprises a ratchet for rotating said counter-threaded links.

5. The tensioning device as recited in claim 1, wherein the fixed end of said indicator rod is disposed adjacent to the point of attachment of said elongated flat spring to said rotatable shaft.

* * * * *